United States Patent [19]
Johnston

[11] 3,749,294
[45] July 31, 1973

[54] FISHING ROD HOLDER
[76] Inventor: Ralph D. Johnston, 10721 Ranchito, El Monte, Calif. 91731
[22] Filed: Aug. 27, 1971
[21] Appl. No.: 175,504

[52] U.S. Cl. .............................................. 224/5 E
[51] Int. Cl. ............................................. A45f 5/00
[58] Field of Search ........................... 224/5 E, 5 Y; 248/7.1, 38

[56] References Cited
UNITED STATES PATENTS

| 921,900 | 5/1909 | Shuster | 224/5.1 |
| 877,802 | 1/1908 | Shuster | 224/5.1 |
| 839,473 | 12/1906 | Gra | 224/5.1 X |
| 3,507,424 | 4/1970 | Burkins | 224/5 V |
| 615,055 | 11/1898 | Woods | 224/5.1 |

Primary Examiner—Gerald M. Forlenza
Assistant Examiner—Jerold M. Forsberg
Attorney—Boniard I. Brown

[57] ABSTRACT

A fishing rod holder to be worn by a fisherman to permit him to hold a fishing rod in upright position with one hand and net a fish on the line with the other hand. The holder has a support member such as a plate to be secured against the wearer's midriff by a harness or the like which permits the fishing rod to swing fore and aft, and a rod mounting bracket removably and pivotally mounted on the plate to permit removal of the fishing rod from the holder and pivotal adjustment of the rod from side to side to locate the rod in front of either shoulder or in any angular position between the shoulders.

4 Claims, 4 Drawing Figures

PATENTED JUL 31 1973  3,749,294

INVENTOR
RALPH D. JOHNSTON
BY
ATTORNEY

FISHING ROD HOLDER

BACKGROUND OF THE INVENTION

1. Field of the Invention

This invention relates generally to fishing aids and more particularly to a novel fishing rod holder to be worn by a fisherman.

2. Discussion of the Prior Art

A variety of fishing rod holders have been devised for holding or supporting a fishing rod in fishing position. Some of these holders, such as those disclosed in U.S. Pat. Nos. 1,719,695 and 2,981,509 are designed for attachment to boats, poles, or other similar supports. Other fishing rod holders, such as that shown in U.S. Pat. No. 2,576,624, are designed to be worn by a fisherman so that he may hold the rod upright with one hand and net a fish on the line with the other hand. The present invention relates to an improved fishing rod holder of this latter type.

SUMMARY OF THE INVENTION

The fishing rod holder of the invention has a support member such as a plate with a harness or the like for securing the plate to the wearer's midriff. Pivotally mounted on the plate is a rod support bracket having means for attachment to the handle end of a fishing rod. The support plate harness permits swinging of the fishing rod fore and aft. The pivoted rod support bracket permits pivotal adjustment of the rod from side to side to locate the rod in front of either shoulder or in any angular position between the shoulders.

The rod supporting bracket of the disclosed fishing rod holder is a generally L-shaped member. One arm of this bracket is secured to the fishing rod. The other bracket arm fits removably within a socket in a bracket mounting arm pivoted on the support plate, such that the rod and bracket may be easily removed.

DESCRIPTION OF THE PREFERRED EMBODIMENT

Figure 1:
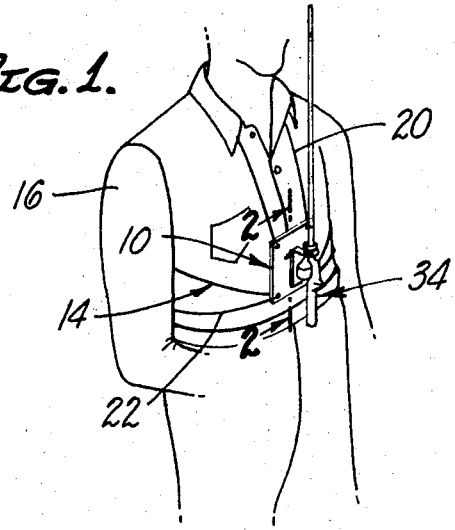
FIG. 1 illustrates a present fishing rod holder being worn by a fisherman.

The illustrated fishing rod holder 10 has a support member 12 in the form of a generally flat rectangular plate. This plate is relatively stiff and may be constructed of metal or plastic. Attached to the four corners of the plate is a harness 14 for securing the plate to the body of a fisherman 16 with the rear surface 18 of the plate in contact with his midriff region. The particular harness shown includes a halter 20 which extends about the wearer's neck and a waist band 22 which encircles the wearer's waist.

Figure 2:
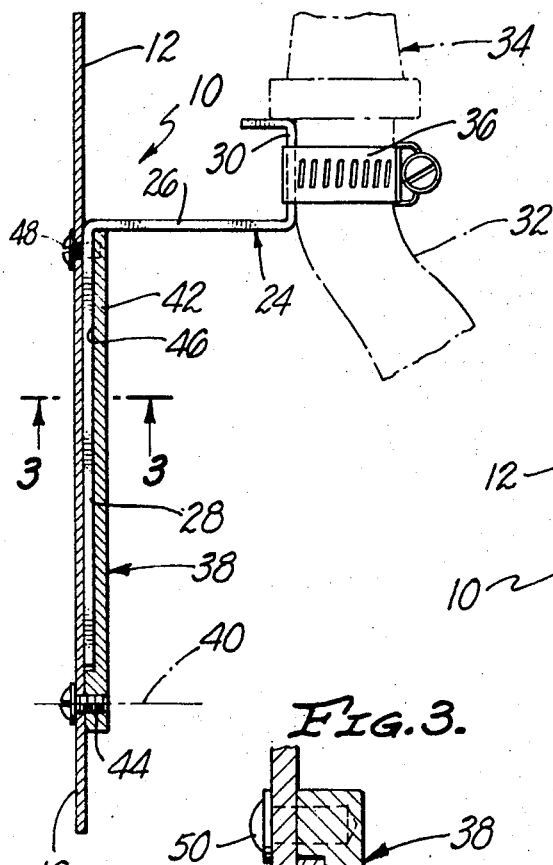
FIG. 2 is an enlarged section taken on line 2—2 in FIG. 1.
Figure 3:
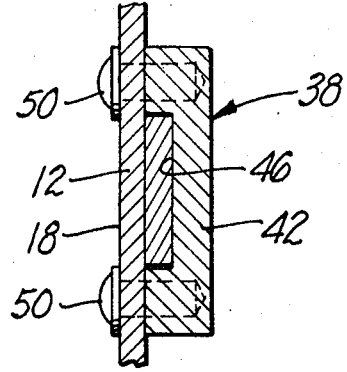
FIG. 3 is an enlarged section taken on line 3—3 in FIG. 2.
Figure 4:
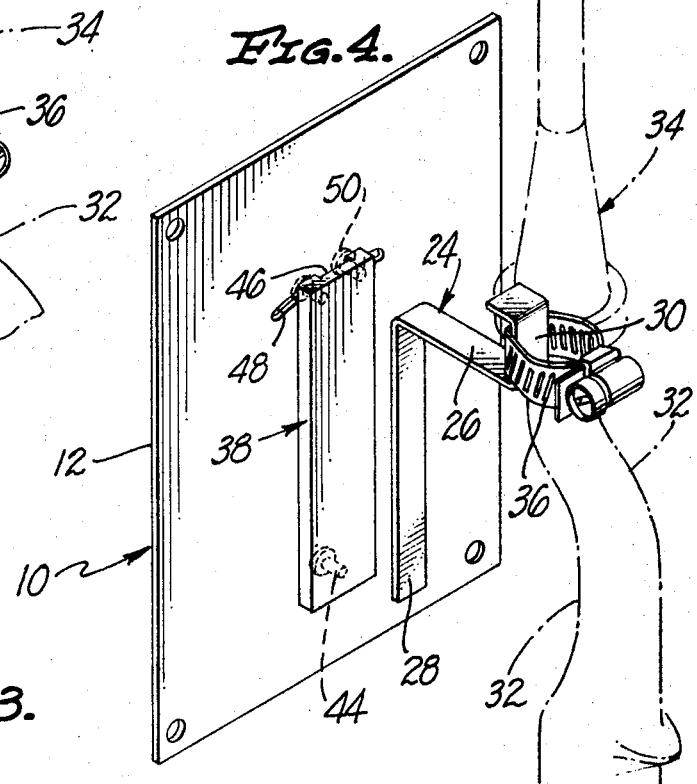
FIG. 4 is a perspective view of the holder.

At the front side of the support plate 12 is a rod supporting bracket 24. This bracket is an L-shaped bracket member with legs 26 and 28. Bracket leg 26 has an upwardly and rearwardly turned front end 30 which is adapted to seat against the handle end 32 of a fishing rod 34 in the manner shown best in FIG. 2. The rod is secured to the bracket by a base clamp 36 which encircles the rod handle and the front turned end of the bracket.

Bracket 24 is pivotally attached to the support plate 12 by mounting means 38 for swinging of the bracket and hence the fishing rod 34 on an axis 40 transverse to the rear support plate surface 18 and the longitudinal axis of the rod. The rod is thus swingable from side to side of the wearer's body. The bracket mounting means 38 comprises a bracket mounting arm 42 pivotally attached at its lower end to the support plate 12 by a pivot 44. Extending into the upper end of the arm 42 is a socket 46 for slidably receiving the bracket leg 28. Socket 46 is formed by a groove or recess in the rear side of the arm and is dimensioned to permit removal of the bracket 24 and fishing rod 34 when desired.

Formed in the support plate 12 is a curved slot 48 centered on the mounting arm pivot axis 40. A pair of screws 50 extend through this slot and are threaded in the bracket mounting arm 42 to limit swinging of the bracket and arm. These screws may be tightened to secure the bracket and rod in any angular position. The harness 14 permits fore and aft swinging of the fishing rod.

When the fishing rod holder is worn in the manner shown in FIG. 1, the wearer may swing the fishing rod fore and aft to facilitate fishing. Once a fish is hooked and pulled in, the wearer may hold the rod upright with one hand and net the fish with the other hand. The rod mounting bracket and fishing rod may be secured in any angular position most convenient to the user, such as one in which the rod is located in front of one shoulder or the other, or the bracket and rod may be left free to swing from side to side. When desired, the fishing rod may be easily removed by removing the bracket from its pivoted mounting arm.

What is claimed as new in support of Letters Patent is:

1. A fishing rod holder to be worn by a fisherman comprising:

a support plate having front and rear sides, means for securing said plate to the front side of the wearer's body adjacent their midriff region with the rear side of the plate facing the wearer's body, a rodholding bracket for attachment to the handle end of a fishing rod, a bracket mounting arm at the front side of said plate having normally upper and lower ends and a rear side facing said plate, a pivot connecting the lower end of said arm to said plate for swinging of the arm in a plane substantially parallel to the plane of said plate, said arm having a longitudinal recess entering said rear arm side and opening through the upper arm end, said recess being closed at its rear side by said plate to define a socket, said rod holding bracket having a first end slidable in and removable from said socket, a mid-portion extending forwardly from said bracket end, and a second end forwardly of said plate and arm for connection to a fishing rod, said plate having an arcuate slot adjacent the upper end of said arm and curving circularly about said pivot axis of said arm, and limit stop means extending through said slot and secured to said arm in laterally offset relation to said recess for cooperating with said slot to limit swinging of said arm.

2. A fishing rod holder according to claim 1 wherein: said limit stop means comprise a pair of pins secured to said arm at opposite sides of said recess.

3. A fishing rod holder according to claim 1 wherein: said rod holding bracket comprises a flat strap having right angle bends at the junctures of said ends and mid-portion of the bracket.

4. A fishing rod holder according to claim 3 wherein: said limit stop means comprise a pair of pins secured to said arm at opposite sides of said recess.

* * * * *